(12) United States Patent
Stidd

(10) Patent No.: US 6,273,617 B1
(45) Date of Patent: Aug. 14, 2001

(54) WHEEL BEARING SPACERS FOR RACING AUTOMOBILES

(76) Inventor: Robert Stephen Stidd, 194 Ponderosa Cir., Mooresville, NC (US) 28117

(*) Notice: Subject to any disclaimer, the term of this patent is extended or adjusted under 35 U.S.C. 154(b) by 0 days.

(21) Appl. No.: 09/416,512

(22) Filed: Oct. 8, 1999

Related U.S. Application Data

(60) Provisional application No. 60/112,352, filed on Dec. 16, 1998.

(51) Int. Cl.[7] .................................................... F16C 35/07
(52) U.S. Cl. .......................... 384/589; 384/584; 384/562; 384/626
(58) Field of Search .................................... 384/589, 584, 384/571, 562, 626, 544, 537, 540; 301/105.1, 131, 124.1

(56) References Cited

U.S. PATENT DOCUMENTS

| | | | |
|---|---|---|---|
| 1,200,510 | * | 10/1916 | Lockwood ............................ 384/589 |
| 1,265,090 | * | 5/1918 | King ..................................... 384/589 |
| 1,437,833 | * | 12/1922 | Buckwalter ........................... 384/589 |
| 2,105,354 | * | 1/1938 | Hoerle .................................. 384/544 |
| 2,447,928 | * | 8/1948 | Bersgstrom ........................... 384/571 |
| 3,901,568 | * | 8/1975 | Gadd et al. ........................... 384/589 |
| 4,121,871 | * | 10/1978 | Adams ................................ 301/105.1 |
| 4,848,939 | * | 7/1989 | Ludwig ................................. 384/626 |
| 5,048,979 | * | 9/1991 | Coates ............................. 384/589 X |
| 5,328,275 | * | 7/1994 | Winn et al. ....................... 384/589 X |
| 5,391,004 | * | 2/1995 | Matczak et al. .................. 384/589 X |
| 5,492,419 | * | 2/1996 | Miller et al. ...................... 384/584 X |
| 5,882,123 | * | 3/1999 | Lee et al. ......................... 384/571 X |
| 5,997,103 | * | 12/1999 | Wagner ............................. 301/105.1 |

OTHER PUBLICATIONS

Drawings of admitted prior art devices.

* cited by examiner

*Primary Examiner*—Charles A. Marmor
*Assistant Examiner*—Ha Ho
(74) *Attorney, Agent, or Firm*—Adams, Schwartz & Evans, P.A.

(57) ABSTRACT

A wheel bearing assembly for a wheel assembly of a motor vehicle, wherein the wheel bearing assembly includes a wheel hub having inner and outer bearing race shoulders for receiving respective inner and outer roller bearing races and roller bearing housings with roller bearings therein, the wheel bearing assembly adapted for being mounted on a wheel axle. The wheel bearing assembly comprises an annular spacer body having a central opening for permitting the spacer body to be positioned onto the axle between one of the inner or outer roller bearing housings for exerting an axial compression thereon, a spacer cap having a central opening for permitting the spacer cap to be positioned onto the axle between the inner and outer roller bearing housings and in engaging coaxial alignment with the spacer body for engaging the other of the inner or roller bearing housings, and an annular shim having a central opening for permitting the shim to be positioned onto the axle between the spacer body and the spacer cap. The shim has an axially-extending dimension predetermined to produce with the spacer body and the spacer cap a combined axially-extending dimension suitable to create and maintain a predetermined amount of axial compression on the inner and outer roller bearing housings against the respective inner and outer bearing races sufficient to prevent rotation of the bearing races relative to the roller bearing housings.

9 Claims, 8 Drawing Sheets

WHEEL BEARING SPACERS FOR RACING AUTOMOBILES

This application is based on and claims priority from Provisional Patent Application Ser. No. 60/112,352, filed on Dec. 16, 1998.

TECHNICAL FIELD AND BACKGROUND OF THE INVENTION

This invention relates to a wheel bearing spacer for automobiles. The invention as described and claimed was designed and intended for racing automobiles, but could be used on any vehicle. The spacers save shop time in setting up hub assemblies when preparing a racing vehicle for a race. The spacers includes shims which permit exact tolerances to be easily and repetitively achieved.

As is well known, both front and rear automobile wheel hub assemblies include tapered, caged roller bearings which permit low-resistance rotation between the wheel hub and the spindle (front assembly) and the axle (rear assembly). In both street and racing vehicles the roller bearings rotate against tapered races fitting into shoulders in the wheel hub. In street vehicles, the roller bearing housings themselves may rotate to some degree as well as the roller bearings in the housings. This is ordinarily not a problem. In racing vehicles, however, rotation of the bearing housing itself can cause serious damage due to the extreme speeds and related abuse imposed on the wheels as a result of heating of the spindle or axle by contact with the bearing housing.

One prior art solution was to insert a single-sized spacer around the spindle or axle to put a desired amount of axial compression on the inner and outer bearing housings to keep them stationarily seated against the races. This did not account for minor variations in bearing dimensions and tolerances.

Another prior art solution was to use a spacer with a shim positioned on the front face of the spacer. While better tolerances could be obtained in principle, tightening the spacer into resulting in bending and crimping of the shims.

The present invention solves these problems.

SUMMARY OF THE INVENTION

Therefore, it is an object of the invention to provide a spacer assembly for a motor vehicle which speeds set-up time.

It is another object of the invention to provide a spacer assembly which permits quick and easy adjustments to account for variations in bearing assembly and wheel assembly spaces and tolerances.

It is another object of the invention to provide a spacer assembly which avoids damage to the shims during tightening of the bearing assemblies against the spacer.

These and other objects of the present invention are achieved in the preferred embodiments disclosed below by providing a wheel bearing assembly for a wheel assembly of a motor vehicle, wherein the wheel bearing assembly includes a wheel hub having inner and outer bearing race shoulders for receiving respective inner and outer roller bearing races and roller bearing housings with roller bearings therein, the wheel bearing assembly adapted for being mounted on a wheel axle. The wheel bearing assembly comprises an annular spacer body having a central opening for permitting the spacer body to be positioned onto the axle between one of the inner or outer roller bearing housings for exerting an axial compression thereon, a spacer cap having a central opening for permitting the spacer cap to be positioned onto the axle between the inner and outer roller bearing housings and in engaging coaxial alignment with the spacer body for engaging the other of the inner or roller bearing housings, and an annular shim having a central opening for permitting the shim to be positioned onto the axle between the spacer body and the spacer cap. The shim has an axially-extending dimension predetermined to produce with the spacer body and the spacer cap a combined axially-extending dimension suitable to create and maintain a predetermined amount of axial compression on the inner and outer roller bearing housings against the respective inner and outer bearing races sufficient to prevent rotation of the bearing races relative to the roller bearing housings.

According to one preferred embodiment of the invention, the wheel bearing assembly is adapted to be mounted on the front wheel assembly of the motor vehicle.

According to another preferred embodiment of the invention, the wheel bearing assembly is adapted to be mounted on the rear wheel assembly of the motor vehicle.

According to yet another preferred embodiment of the invention, the spacer body includes a cylindrical body portion and a frustoconical body portion.

According to yet another preferred embodiment of the invention, the frustoconical body portion includes an end opening for receiving a portion of the spacer cap therein.

Preferably, the invention includes a plurality of shims having different axially-extending dimensions for being used singly or in combination with each other for form a shim assembly having an axially-extending dimension predetermined to produce with the spacer body and the spacer cap a combined axially-extending dimension suitable to create and maintain a predetermined amount of axial compression on the inner and outer roller bearing housings against the respective inner and outer bearing races sufficient to prevent rotation of the bearing races relative to the roller bearing housings.

According to yet another preferred embodiment of the invention, the spacer cap includes a sleeve portion for being received into the spacer body, and further wherein the shim is adapted to be received and supported on the sleeve.

According to yet another preferred embodiment of the invention, the spacer cap includes a sleeve portion for being received into the spacer body, and further wherein the shims forming the shim assembly are adapted to be received and supported on the sleeve.

An embodiment of the method according to the invention comprises the steps of mounting a spacer body on the axle between the inner and outer roller bearing housings and engaging one of the inner and outer roller bearing housings, mounting a spacer cap on the axle between the inner and outer roller bearing housings and engaging the other of the inner and outer roller bearing housings, mounting at least one shim on the axle between the spacer body and the spacer cap. The at least one shim has an axially-extending dimension predetermined to produce with the spacer body and the spacer cap a combined axially-extending dimension suitable to create and maintain a predetermined amount of axial compression on the inner and outer roller bearing housings against respective inner and outer bearing races sufficient to prevent rotation of the bearing races relative to the roller bearing housings.

According to a preferred embodiment of the invention, the step of mounting at least one shim on the axle comprises the step of mounting a plurality of shims defining a shim assembly on the axle. The shim assembly has an axially-extending dimension predetermined to produce with the spacer body and the spacer cap a combined axially-extending dimension suitable to create and maintain a predetermined amount of axial compression on the inner and outer roller bearing housings against respective inner and outer bearing races sufficient to prevent rotation of the bearing races relative to the roller bearing housings.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
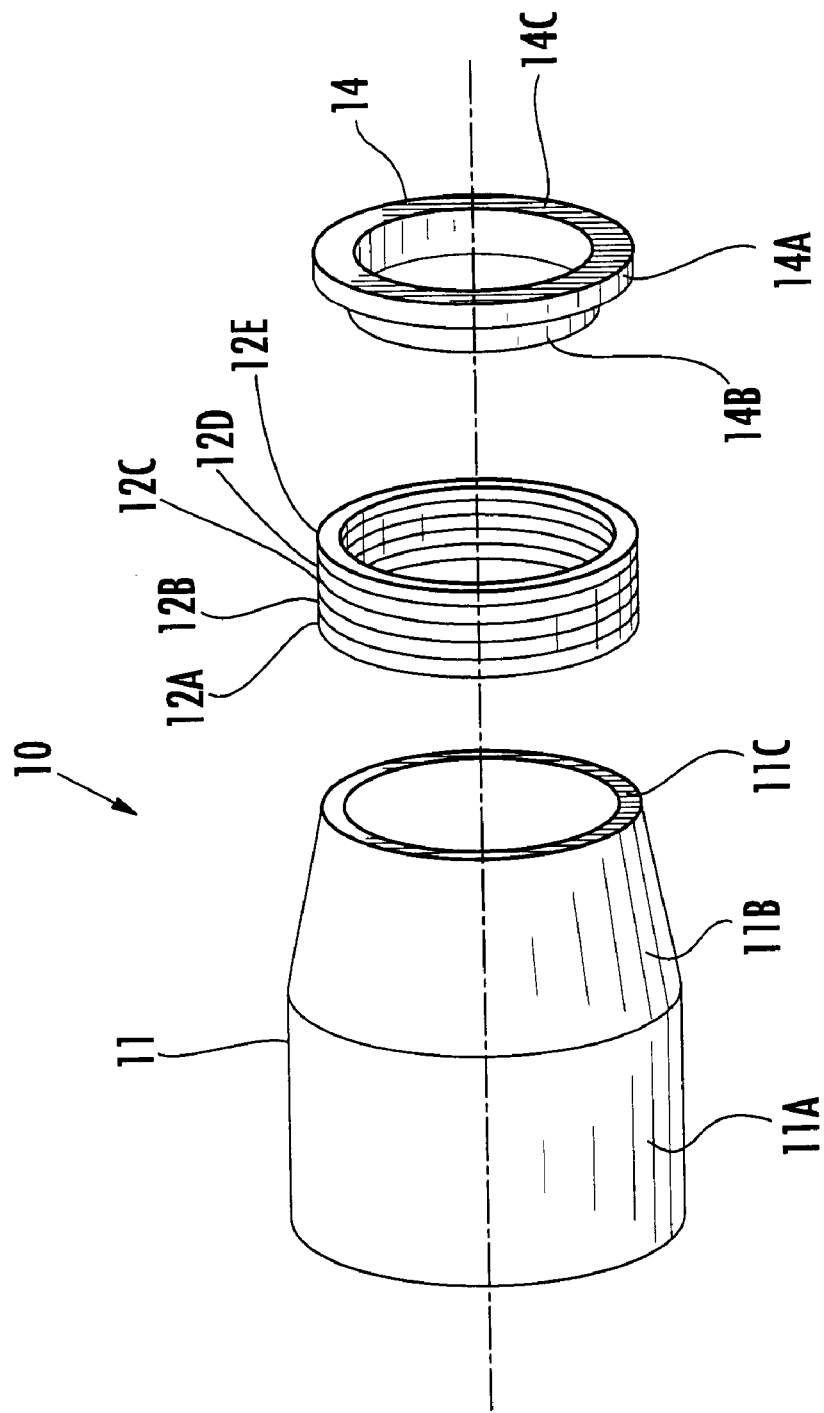
FIG. 1 is an exploded perspective view of a front wheel spacer assembly according to an embodiment of the present invention.

Referring now specifically to the drawings, a front wheel spacer assembly according to a preferred embodiment of the present invention is illustrated in FIG. 1 and shown generally at reference numeral 10. Spacer assembly 10 includes a spacer body 11, a plurality of annular shims 12A–E, and a spacer cap 14. The spacer body 11, shims 12A–E and spacer cap 14 each define an axially-extending through bore to permit the spacer assembly 10 to be fitted onto a front wheel spindle, as shown and explained below.

The spacer body 11 includes a cylindrical portion 11A, a fustoconical portion 11B and a flat, annular front face 11C. The spacer cap 14 includes a cap body 14A, and a reduced diameter sleeve 14B for being fitted into the front opening of spacer body 11. Spacer cap 14 also includes a flat, annular front face 14C.

Figure 2:
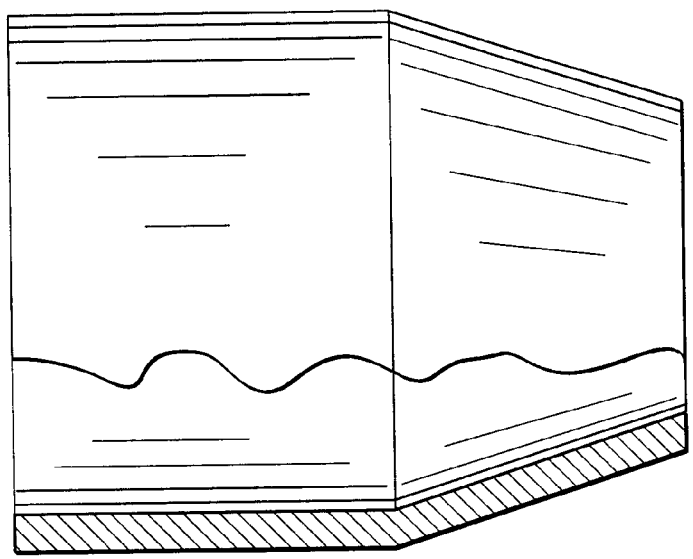
FIG. 2 is a vertical cross-sectional side view of the front wheel assembly spacer body shown in FIG. 1.
Figure 3:
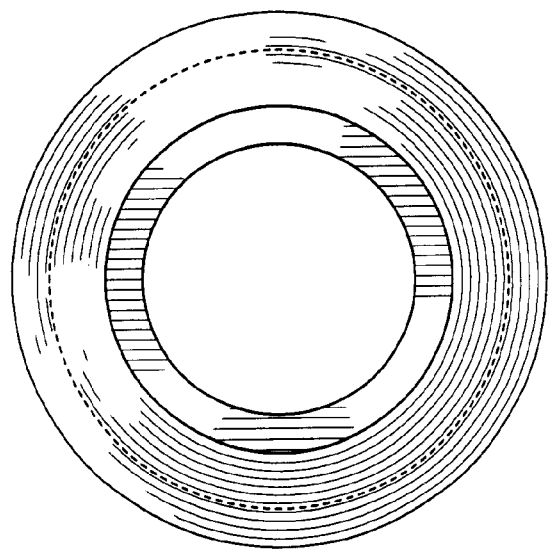
FIG. 3 is a vertical cross-sectional end view of a front wheel assembly spacer body as shown in FIG. 2.

Cross-sectional and end views of the spacer body 11 are shown in FIGS. 2 and 3.

Figure 4:
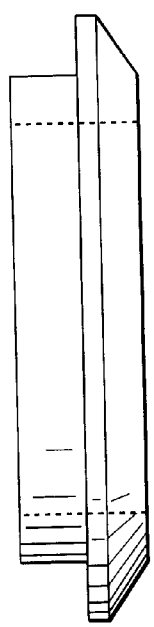
FIG. 4 is side elevation of the front wheel assembly spacer cap shown in FIG. 1.
Figure 5:
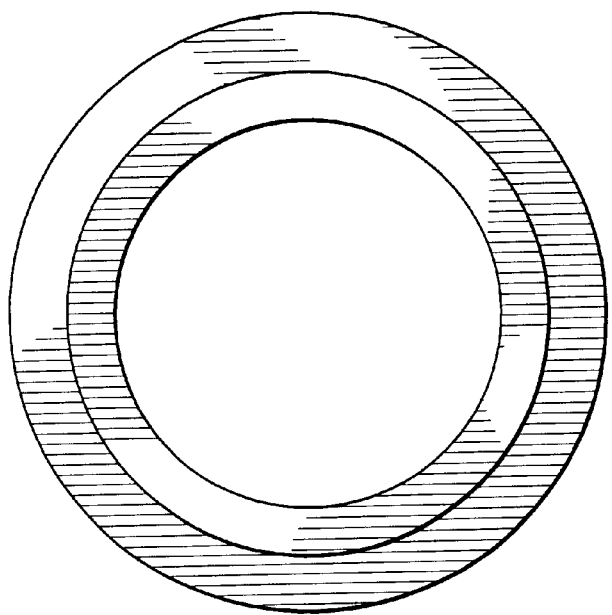
FIG. 5 is an end elevation of the front wheel assembly spacer cap shown in FIG. 1.

Cross-sectional and end views of the spacer cap 14 are shown in FIGS. 4 and 5.

Figure 6:
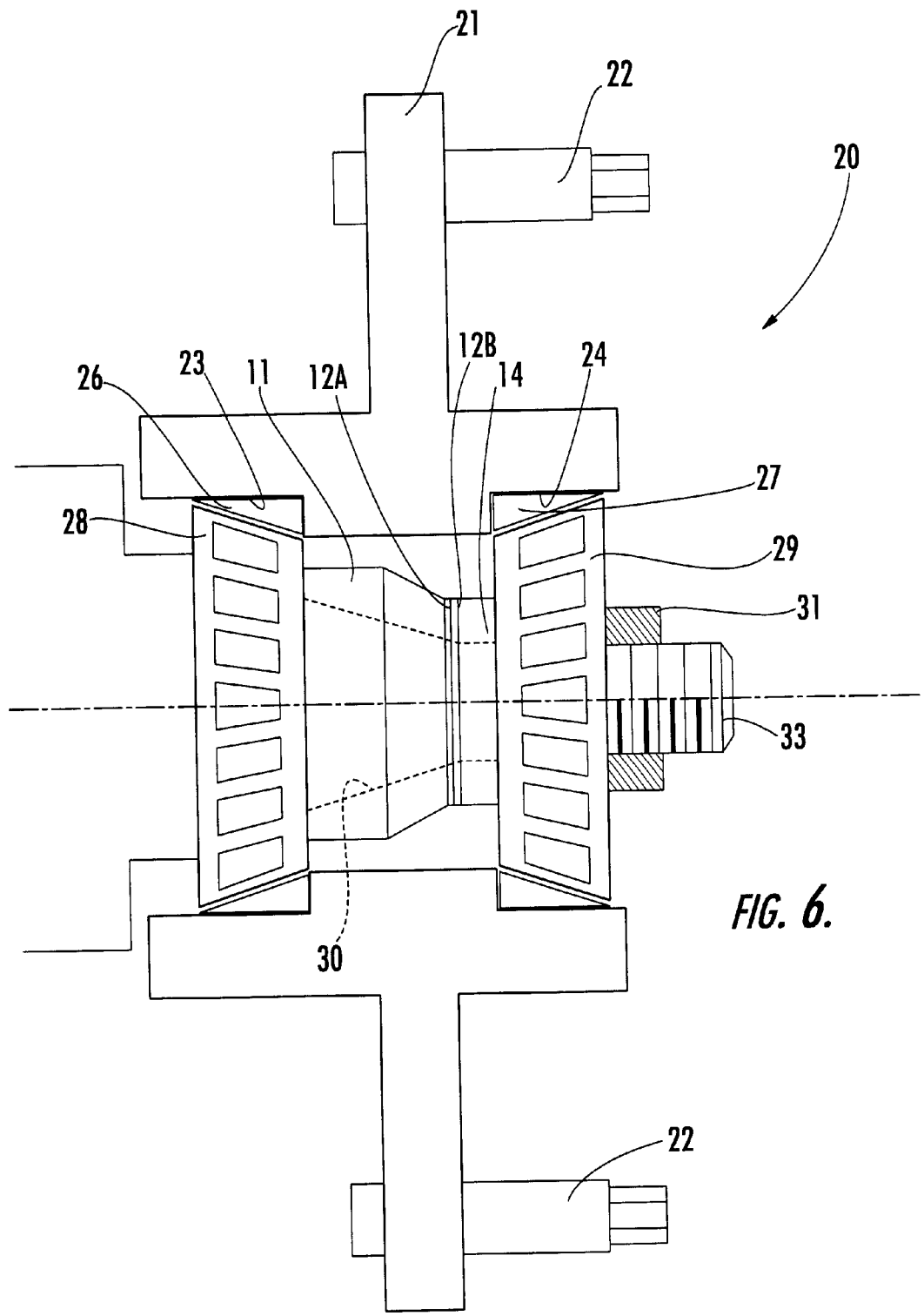
FIG. 6 is a cross-sectional view of a front wheel assembly including the spacer shown in FIGS. 1–5.
Figure 7:
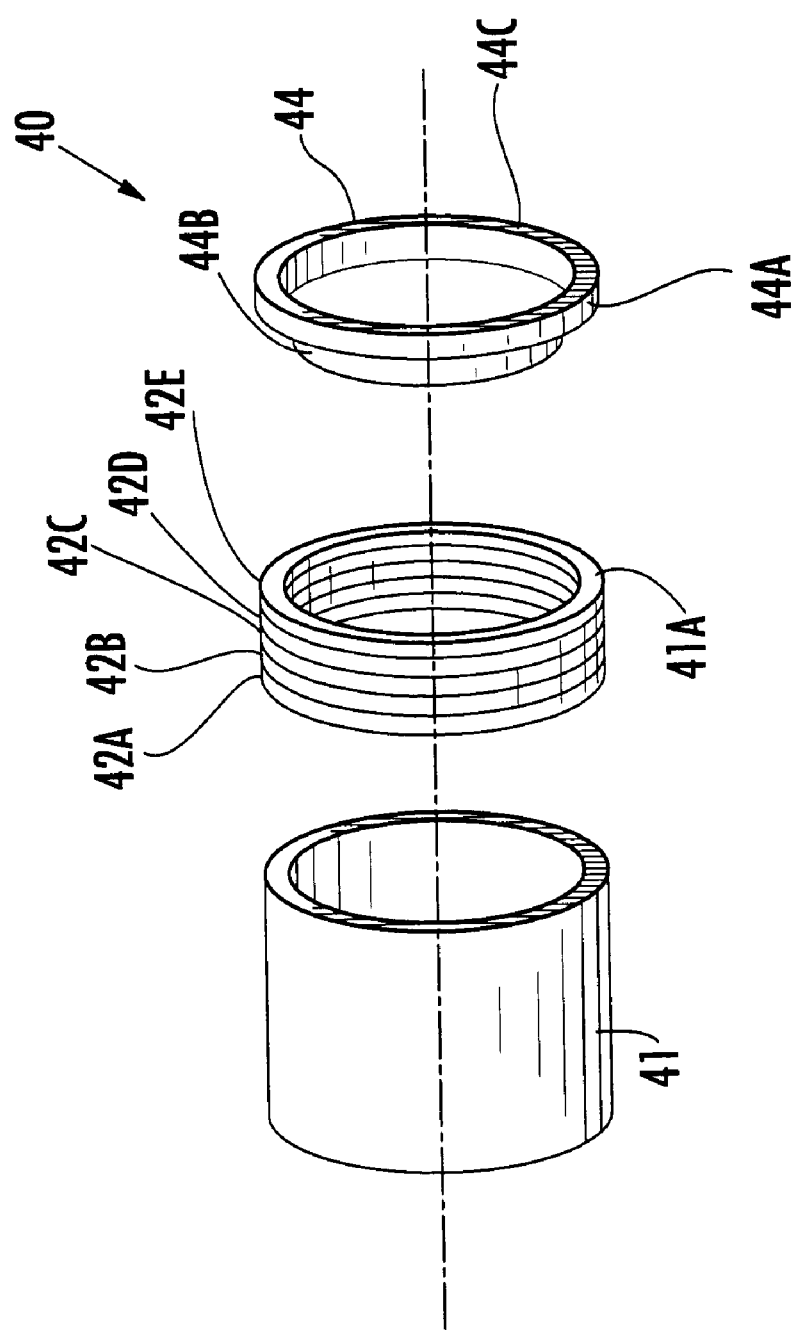
FIG. 7 is an exploded perspective view of a rear wheel spacer assembly according to an embodiment of the present invention.

Referring now to FIG. 6, spacer 10 is shown in place in a front wheel assembly 20 of a motor vehicle. The front wheel assembly 20 includes a wheel hub 21 including a plurality of lug nuts 22 for securely mounting a wheel (not shown) to the hub 21. Hub 21 includes inner and outer bearing race shoulders 23 and 24 in the hub 21, and which receive respective inner and outer tapered roller bearing races 26 and 27. Tapered roller bearing assemblies 28 and 29 are received onto the bearing races 26 and 27, as shown.

The entire wheel assembly 20 is mounted on the front wheel spindle 30. The wheel assembly 20 is held on the spindle 30 by an axle nut 31 received on a threaded end portion 33 of spindle 30. The term "spindle" is a term of art which refers specifically to the elongated support onto which a front wheel assembly is mounted, as distinct from the term "axle" which is typically used to refer specifically to an elongated support onto which a rear wheel assembly is mounted. In the claims the term "axle" is used to mean both the front and rear supports onto which the respective front or rear wheel assembly is mounted. In description of the preferred embodiment, the terms are used in their usual context to refer separately to front and rear wheel assemblies.

Spacer assembly 10 is positioned on spindle 30 between the inner and outer roller bearing assemblies 28 and 29. The spacer assembly 10 permits precise adjustment of the torque between the roller bearing assemblies 28 and 29 and their respective bearing races 23 and 24. Thus, sufficient torque can be applied to prevent rotation of the roller bearing assemblies 28 and 29 on the spindle 30, while at the same time insuring proper spacing and torque between the roller bearing assemblies 28 and 29, and respective bearing races 26 and 27.

Shims 12A–E can be furnished in any thickness, and combined to achieve the required spacing. One preferred embodiment of the spacer assembly 10 includes five shims 12A–E having axially extending dimensions of 0.001, 0.002, 0.003, 0.004 and 0.005 inches from which the selection of the proper spacing can be made. As shown in FIG. 6, two shims 12A and 12B are positioned between the spacer body 11A and spacer cap 11C and add 0.003 inches to the overall length of the spacer assembly 10.

Referring now to FIGS. 7–12, a rear wheel spacer assembly according to a preferred embodiment of the present invention is shown at reference numeral 40. Rear spacer assembly 40 includes a spacer body 41, a plurality of annular shims 42A–E, and a spacer cap 44. The spacer body 41, shims 42A–E and spacer cap 44 each define an axially-extending through bore to permit the spacer 40 to be fitted onto a rear wheel axle, as shown and explained below.

The spacer body 41 includes cylindrical and includes a flat, annular front face 41A. The spacer cap 44 includes a cap body 44A, and a reduced diameter sleeve 44B for being fitted into the front opening of spacer body 11. Spacer cap 14 also includes a flat, annular front face 14C.

Figure 8:
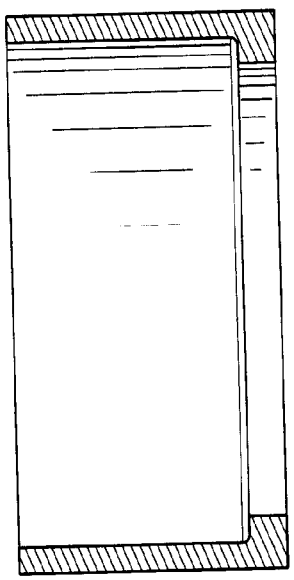
FIG. 8 is a vertical cross-sectional side view of the rear wheel assembly spacer body shown in FIG. 7.
Figure 9:
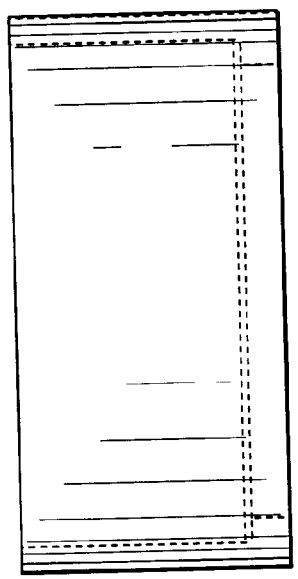
FIG. 9 is a side elevation of the front wheel assembly spacer body as shown in FIG. 8.

Cross-sectional and side elevation views of the spacer body 41 are shown in FIGS. 8 and 9.

Figure 10:
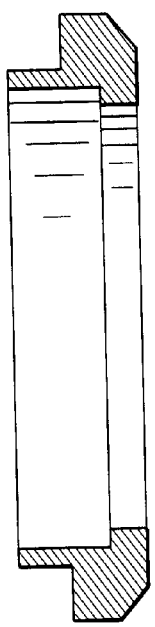
FIG. 10 is a cross-sectional side elevation view of the rear wheel assembly spacer body shown in FIG. 7.
Figure 11:
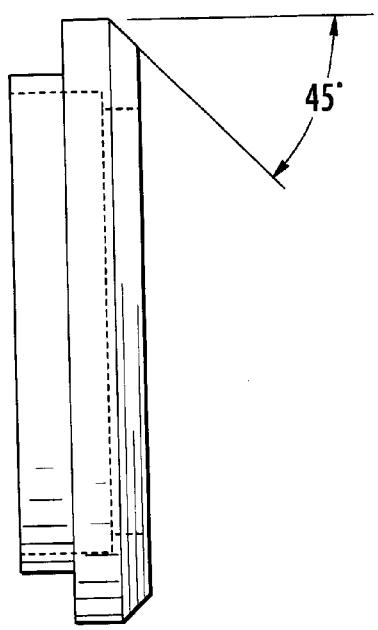
FIG. 11 is side elevation of the rear wheel assembly spacer cap shown in FIG. 10.

Cross-sectional and side elevation views of the spacer cap 44 are shown in FIGS. 10 and 11.

Figure 12:
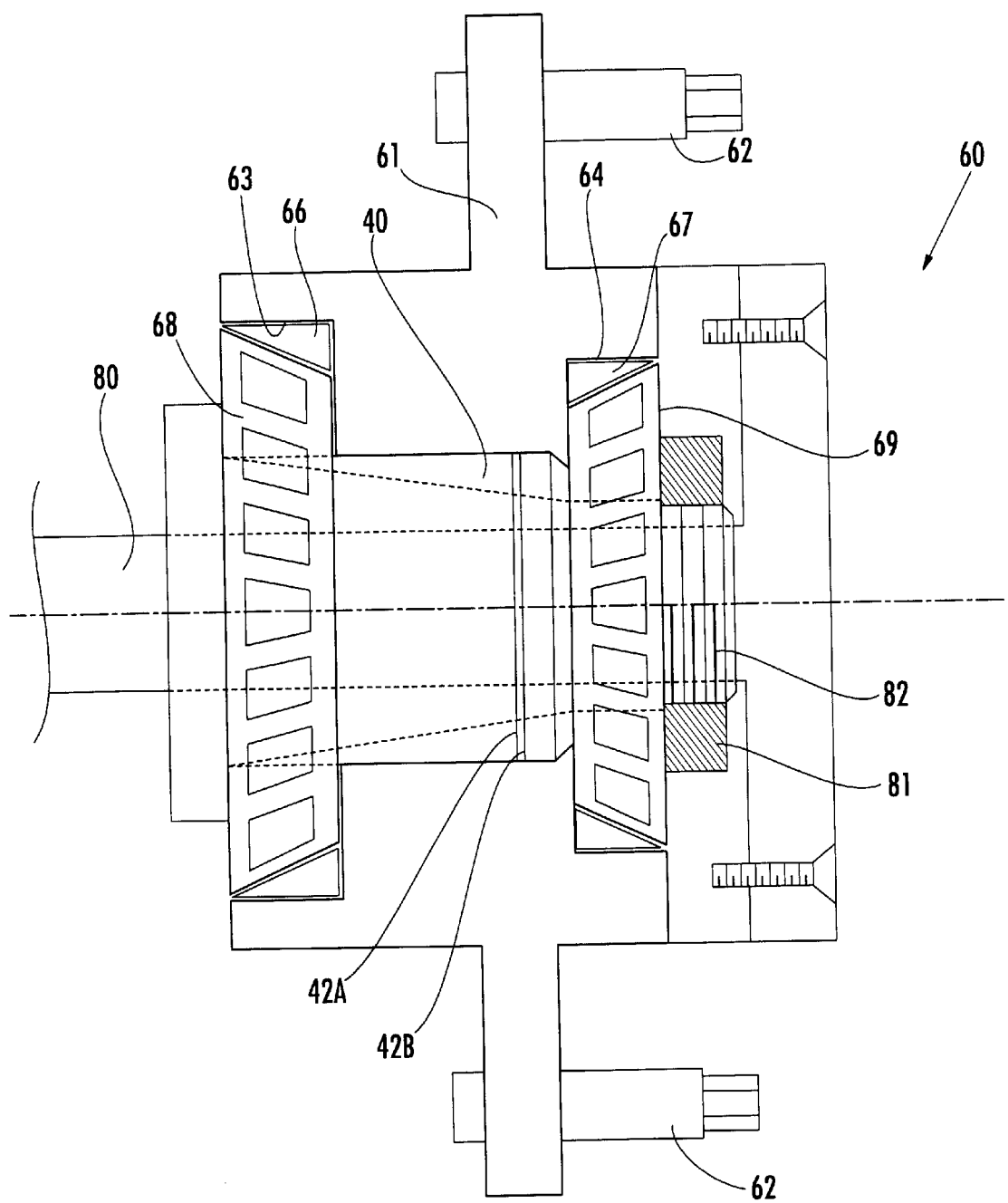
FIG. 12 is a cross-sectional view of a rear wheel assembly including the spacer shown in FIGS. 7–11.

Referring now to FIG. 12, spacer 40 is shown in place in a rear wheel assembly 60 of a motor vehicle. The rear wheel assembly 60 includes a wheel hub 61 including a plurality of lug nuts 62 for securely mounting a wheel (not shown) to the hub 61. Hub 61 is mounted and rotates on a rear axle 80 by means of an axle nut 81 threaded onto a threaded end portion the axle 80.

Wheel assembly 60 includes inner and outer bearing race shoulders 63 and 64 in the hub 61, and which receive respective inner and outer tapered roller bearing races 66 and 67. Tapered roller bearing assemblies 68 and 69 are received onto the bearing races 66 and 67, as shown.

Spacer assembly 40 is positioned on axle 80 between the inner and outer roller bearing assemblies 68 and 69. The spacer assembly 40 permits precise adjustment of the torque between the roller bearing assemblies 68 and 69 and their respective bearing races 63 and 64. Thus, sufficient torque can be applied to prevent rotation of the roller bearing assemblies 68 and 69 on the axle 80, while at the same time insuring proper spacing and torque between the roller bearing assemblies 68 and 69, and respective bearing races 66 and 67.

Shims 42A–E can be furnished in any thickness and combined to achieve the required spacing. One preferred embodiment of the spacer assembly 40 includes five shims 42A–E having axially extending dimensions of 0.001, 0.002, 0.003, 0.004 and 0.005 inches from which the selection of the proper spacing can be made. As shown in FIG. 12, two shims 42A and 42B are positioned between the spacer body 41A and spacer cap 41C and add 0.003 inches to the overall length of the spacer assembly 40.

A spacer assembly for a motor vehicle is described above. Various details of the invention may be changed without departing from its scope. Furthermore, the foregoing description of the preferred embodiment of the invention and the best mode for practicing the invention are provided for the purpose of illustration only and not for the purpose of limitation.

I claim:

1. A wheel bearing assembly for a wheel assembly of a motor vehicle, wherein said wheel bearing assembly includes a wheel hub having inner and outer bearing race shoulders for receiving respective inner and outer roller bearing races and roller bearing housings with roller bearings therein, said wheel bearing assembly adapted for being mounted on a wheel axle, said wheel bearing assembly comprising:

(a) an annular spacer body including a cylindrical body portion and a frustoconical body portion, and having a central opening for permitting the spacer body to be positioned onto the axle between the inner and outer roller bearing housings for exerting an axial compression thereon;

(b) a spacer cap having a central opening for permitting the spacer cap to be positioned onto the axle between the inner and outer roller bearing housings and in engaging coaxial alignment with the spacer body for engaging the other of the inner or outer roller bearing housings; and (c) at least one annular shim having a central opening for permitting the shim to be positioned onto the axle between the spacer body and the spacer cap, the shim having an axially-extending dimension predetermined to produce with the spacer body and the spacer cap a combined axially-extending dimension suitable to create and maintain a predetermined amount of axial compression on the inner and outer roller bearing housings against the respective inner and outer bearing races while preventing rotation of the inner and outer roller bearing housings relative to the axle.

2. A wheel bearing assembly according to claim 1, wherein said wheel bearing assembly is adapted to be mounted on the front wheel assembly of the motor vehicle.

3. A wheel bearing assembly according to claim 1, wherein said wheel bearing assembly is adapted to be mounted on the rear wheel assembly of the motor vehicle.

4. A wheel bearing assembly according to claim 1, wherein said frustoconical body portion includes an end opening for receiving a portion of said spacer cap therein.

5. A wheel bearing assembly according to claim 2, and including a plurality of shims having different axially-extending dimensions for being used singly or in combination with each other for forming a shim assembly having an axially-extending dimension predetermined to produce with the spacer body and the spacer cap a combined axially-extending dimension suitable to create and maintain a predetermined amount of axial compression on the inner and outer roller bearing housings against the respective inner and outer bearing races sufficient to prevent rotation of the roller bearing housings relative to the axle.

6. A wheel bearing assembly according to claim 1, wherein said spacer cap includes a shoulder portion for being received into the spacer body, and further wherein said shim is adapted to be received and supported on said shoulder.

7. A wheel bearing assembly according to claim 5, wherein said spacer cap includes a shoulder portion for being received into the spacer body, and further wherein said shims forming the shim assembly are adapted to be received and supported on said shoulder.

8. A method of spacing apart inner and outer roller bearing housings carried on the wheel axle of a wheel assembly of a motor vehicle to create and maintain a predetermined amount of axial compression on the inner and outer roller bearing housings against respective inner and outer bearing races sufficient to prevent rotation of the bearing races relative to the roller bearing housings, comprising the steps of:

(a) mounting a spacer body on the axle between the inner and outer roller bearing housings and engaging one of the inner and outer roller bearing housings;

(b) mounting a spacer cap on the axle between the inner and outer roller bearing housings and engaging the other of the inner and outer roller bearing housings; and (c) mounting at least one shim on the axle between the spacer body and the spacer cap, the at least one shim having an axially-extending dimension predetermined to produce with the spacer body and the spacer cap a combined axially-extending dimension suitable to create and maintain a predetermined amount of axial compression on the inner and outer roller bearing housings against respective inner and outer bearing races sufficient to prevent rotation of the bearing races relative to the roller bearing housings.

9. A method according to claim 8, wherein the step of mounting at least one shim on the axle comprises the step of mounting a plurality of shims defining a shim assembly on the axle, said shim assembly having an axially-extending dimension predetermined to produce with the spacer body and the spacer cap a combined axially-extending dimension suitable to create and maintain a predetermined amount of axial compression on the inner and outer roller bearing housings against respective inner and outer bearing races sufficient to prevent rotation of the bearing races relative to the roller bearing housings.

\* \* \* \* \*